(No Model.) 2 Sheets—Sheet 1.
J. R. FREEMAN.
PHOTOGRAPHIC APPARATUS.
No. 365,435. Patented June 28, 1887.
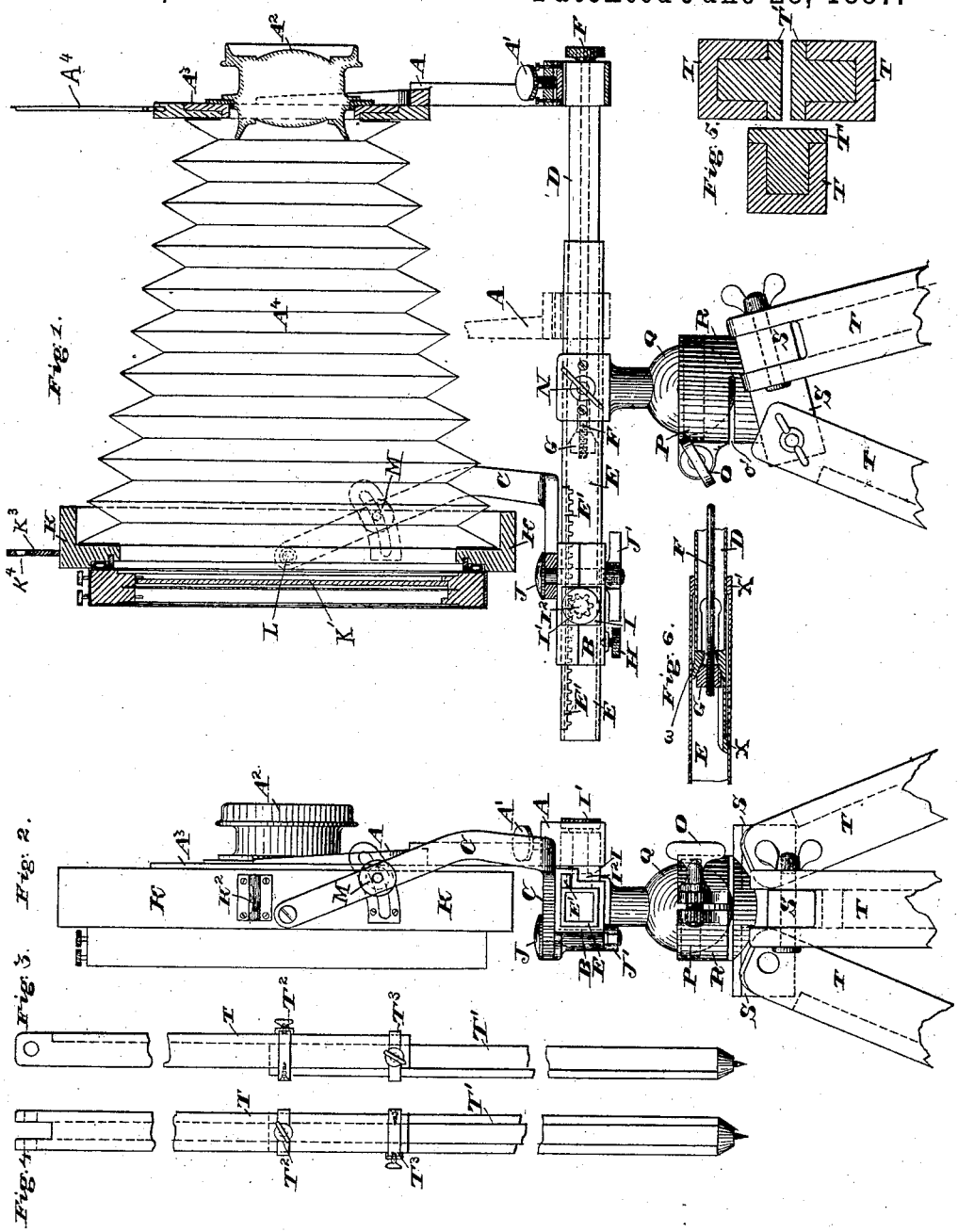
Witnesses:
Fred M. Palmer
R. A. Hale
Inventor:
John R. Freeman

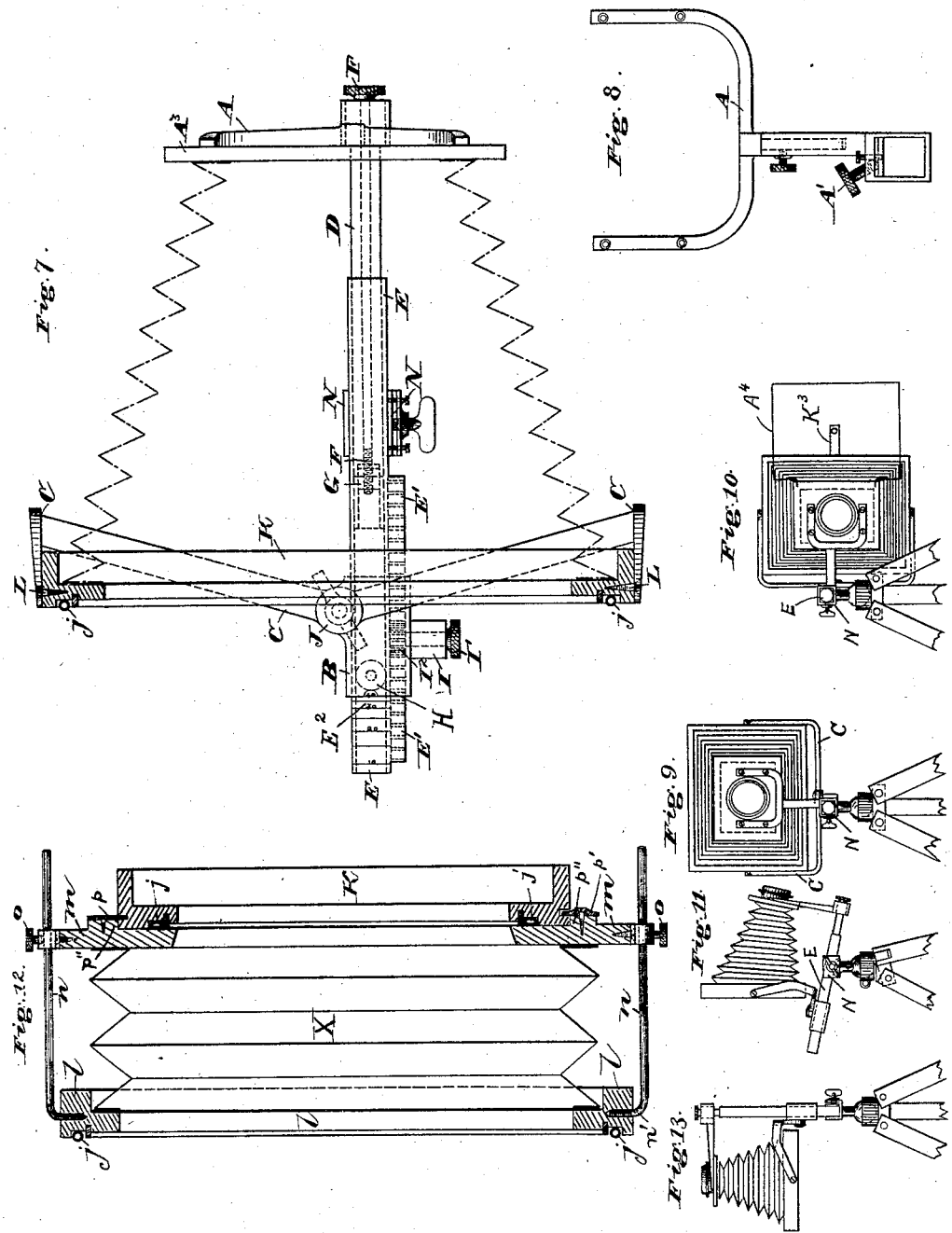

UNITED STATES PATENT OFFICE.

JOHN RIPLEY FREEMAN, OF LAWRENCE, MASSACHUSETTS, ASSIGNOR TO THE SCOVILL MANUFACTURING COMPANY, OF WATERBURY, CONNECTICUT.

PHOTOGRAPHIC APPARATUS.

SPECIFICATION forming part of Letters Patent No. 365,435, dated June 28, 1887.

Application filed May 18, 1885. Renewed May 4, 1887. Serial No. 237,101. (No model.)

*To all whom it may concern:*

Be it known that I, JOHN RIPLEY FREEMAN, a citizen of the United States, residing at Lawrence, in the county of Essex and State of Massachusetts, have invented certain new and useful Improvements in Photographic Apparatus; and I do hereby declare the following to be a full, clear, and exact description of the invention, such as will enable others skilled in the art to which it appertains to make and use the same.

My invention relates to improvements in the construction of the camera-box and its attachments; and the objects of my improvements are, first, to provide a camera-box having greater steadiness in position, greater accuracy in adjustment and facility in pointing in any desired direction, and greater facility for folding into small compass for transportation and in unfolding and setting up ready for use than is found in cameras as heretofore constructed; second, to obtain a large range of adjustment, so that either a very long or a very short focus-lens can be used without resorting to the use of "extension-fronts" or "recess-fronts," as heretofore used; third, to provide a convenient arrangement by which the sensitive plate can be swung so as to stand at any desired angle, either horizontal or vertical, to the optical axis of the camera, and have this swinging or rotation of plate take place about axes which pass through or near to the center of sensitive plates, so that focus of central point of sensitive plate will not be disturbed by such swinging; fourth, to provide means for the accurate focusing of the camera irrespective of the inclination of the plate to the optical axis of the camera, and to provide convenient means for pointing the camera in any desired direction, so that the necessity of first obtaining the image upon a plate of ground glass in the usual way may, if desired, be avoided, especially when taking instantaneous photographs; fifth, to provide a compact "extension-back" which can be conveniently adjusted at any desired angle with the optical axis, and the length of which can be readily varied; sixth, to provide means for excluding all light from entering camera at the joint between plate-holder and the frame which supports it, or between this frame and the extension-back when the latter is used; seventh, to provide a rigid support for the camera-box which can be readily folded into very compact form; eighth, to provide convenient means for revolving and supporting the camera, so that a plate whose surface is longer in one direction than in the other may be exposed in the camera with its greatest length in either a horizontal or a vertical direction, as may be desired. I attain these objects by the use of the apparatus illustrated in the accompanying drawings, in which—

Figure 1 shows a sectional side elevation of the camera as set up ready for use. Fig. 2 shows the apparatus as folded for transportation. Figs. 3 and 4 show the construction of tripod-leg in detail. Fig. 5 shows a cross section through legs of tripod when folded. Fig. 6 shows detail of camera-base. Fig. 7 shows a sectional plan of camera-box and parts connected therewith. Fig. 8 shows a front view of lens-stand or stand for supporting the front end of camera-box. Fig. 9 shows front view of camera in its ordinary position. Fig. 10 shows front view of camera when revolved so as to bring the longer axis of plate vertical. Fig. 11 shows the axis of camera inclined and the plate-frame vertical. Fig. 12 shows a vertical section of the extension-back of camera. Fig. 13 shows the axis of the camera in a vertical position.

The bed of the camera is composed of the bar E, preferably of a hollow rectangular cross-section, upon which is clamped at any desired point the lens-stand A and the focusing slide B, which supports the plate-stand C. Within the before-mentioned tube E slides an extension bar or tube, D, to the end of which the lens-stand is clamped when it is desired to use a lens of ordinary or greater focal length. This inner tube or bar, D, thus forms a part of the bed of the camera, and when using a lens of long focus it can be drawn out, as shown, and securely clamped in any desired position by the thumb-screw F at its outer end, which, acting upon wedges G through the screw-threaded rod F', Fig. 6, expands the inner end of the tube D against the inside of the

cameras, the combination of a rear frame, $l$, forward frame, $m$, and bellows X, with the independently-adjustable connecting-rods $n$, substantially as shown and described.

16. In an extension-back for photographic cameras, the combination of the rear frame $l$, connecting bellows X, forward frame $l$, and clamps $o$, with the rods $n$, pivoted at one end to the rear frame $l$, and removably secured in the clamps $o$, substantially as and for the purpose shown and described.

17. In a sighting device for a photographic camera, the plate $k^3$, removably secured to the rear frame and provided with the eye-hole $k^4$, in combination with the frame $A^4$, removably secured to the forward frame, substantially as and for the purpose shown and described.

In testimony whereof I affix my signature in presence of two witnesses.

JOHN RIPLEY FREEMAN.

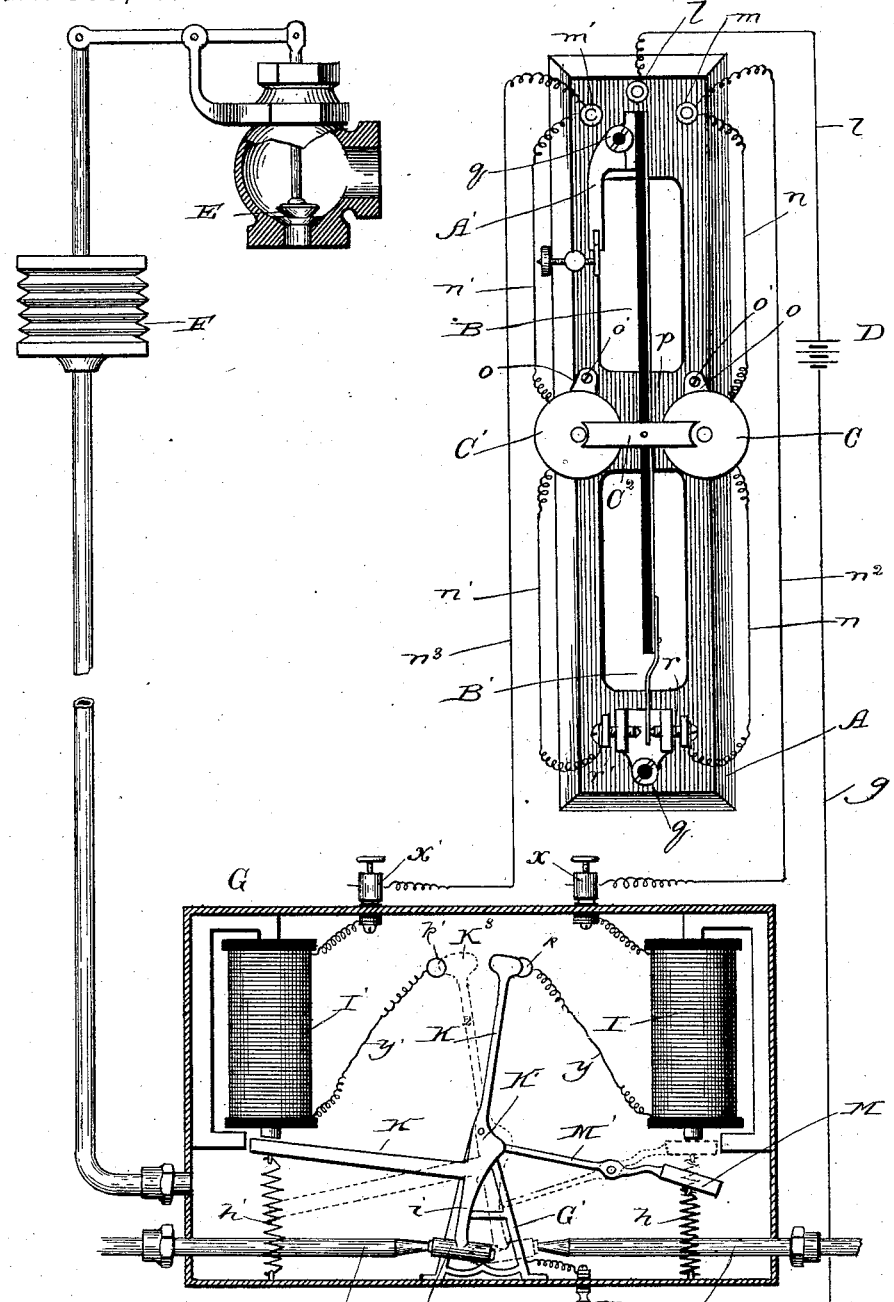

Witnesses:
R. A. HALE,
FRED. M. PALMER.